United States Patent [19]

Tucker et al.

[11] 4,437,605

[45] Mar. 20, 1984

[54] METHODS OF AND APPARATUS FOR PUMPING SOLDER

[75] Inventors: John G. Tucker, Lexington; Hugh A. Wells, Winston-Salem, both of N.C.

[73] Assignee: Western Electric Co., Inc., New York, N.Y.

[21] Appl. No.: 315,835

[22] Filed: Oct. 28, 1981

[51] Int. Cl.³ .............................................. H05K 3/34
[52] U.S. Cl. ................................ 228/180 R; 228/260; 228/37
[58] Field of Search ...................... 228/37, 180 R, 260

[56] References Cited

U.S. PATENT DOCUMENTS

| | | | |
|---|---|---|---|
| 3,100,471 | 8/1963 | Gutbier | 228/260 |
| 3,752,383 | 8/1973 | Allen et al. | 228/260 |
| 3,993,235 | 11/1976 | Boynton | 228/260 |

*Primary Examiner*—Kenneth J. Ramsey
*Assistant Examiner*—M. Jordan
*Attorney, Agent, or Firm*—D. D. Bosben

[57] ABSTRACT

The formation of dross in a molten solder bath (28) by surface agitation of the bath, and the adverse effects of dross on a solder pumping operation, are essentially eliminated by suspending a pump shaft (36) and an impeller (38) thereon for free rotation within a housing (96) in the molten solder bath so that solder in the solder bath is precluded from making any significant contact with the rotating shaft. To insure against binding between the impeller (38) and an opposed horizontal inner surface (132) of the housing (96), a small amount of solder is permitted to flow continuously between the impeller and the surface into contact with the rotating shaft (36) adjacent the impeller. The small solder flow then is exposed to the atmosphere to form a correspondingly small amount of light powdery solder dross (134). The thus formed solder dross (134) is confined within the housing (96) as the dross rises vertically in the housing relative to the shaft (36) to a level above the upper surface of the molten solder bath (28). The dross (134) then spills over a top surface of the housing (96) and falls to the upper surface of the molten solder bath (28) for subsequent removal.

12 Claims, 6 Drawing Figures

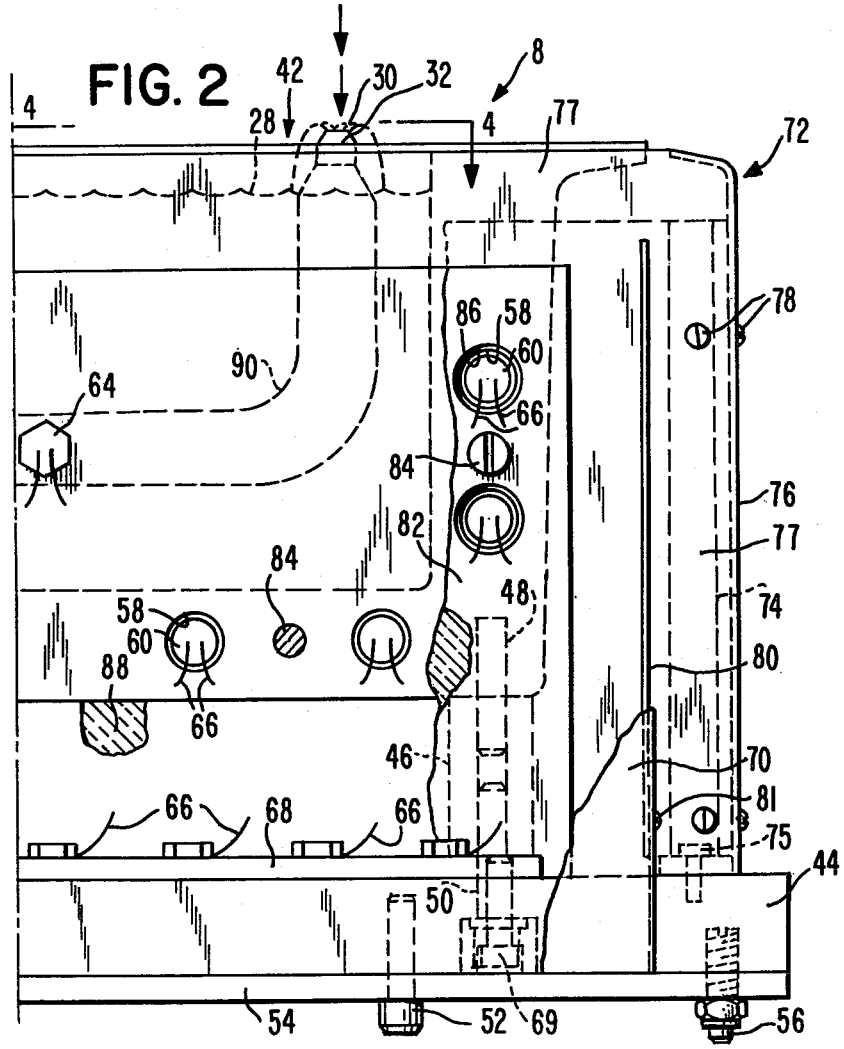

METHODS OF AND APPARATUS FOR PUMPING SOLDER

TECHNICAL FIELD

This invention relates to methods of and apparatus for pumping solder, and more particularly to methods of and apparatus for pumping solder in which the formation of dross in a solder bath by surface agitation of the bath, and the adverse effects of dross on the solder pumping operation, are essentially eliminated.

BACKGROUND OF THE INVENTION

In the manufacture of electrical components, such as transformer and inductor coils, it is a known practice to solder terminals of the coils to wire windings which have been wrapped on the terminals to form wire-wrapped connections, by dipping the terminals and the wire-wrapped connections in a molten solder fountain. The solder fountain is disposed in a molten solder bath and solder is pumped to the fountain by a pump comprising an impeller and an impeller housing submerged in the solder bath. The impeller is mounted on a lower end of a pump drive shaft usually journaled in a lower bearing in the impeller housing, and in an upper bearing located above the surface of the solder bath, with the shaft rotating directly in contact with an upper surface of the solder bath.

This arrangement, in which the pump shaft rotates directly in contact with the upper surface of the molten solder bath, is undesirable for various reasons. In this connection, a characteristic of molten solder is its tendency to burn in the atmosphere and form a residue known in the art as solder "dross", which normally floats on the upper surface of the solder bath. Thus, the solder fountain and the surface of the solder bath inherently form solder dross during the soldering operation, which dross must be periodically removed from the bath surface. When the pump shaft rotates in direct contact with the surface of the solder bath, this formation of dross is substantially increased as a result of the pump shaft agitating the solder bath and causing clean solder in the bath to be continuously circulated and exposed to the atmosphere. Further, it has been found that the dross tends to form in a cone-shaped configuration on and around the rotating pump shaft, with the dross eventually rising along the shaft into the upper shaft support bearing if not timely removed, causing the shaft to bind and freeze in the bearing. Minute dross particles which have become mixed into the solder bath by action of the rotating pump shaft and the flowing solder fountain also tend to work into the submerged lower shaft support bearing in the impeller housing, causing the shaft to freeze in this bearing. The same problem is still encountered when the pump shaft is supported in a bearing located at the surface of the solder bath so as to preclude agitation of the surface and the formation of dross by the rotating shaft. Similarly, even when the pump shaft has been enclosed and tightly packed with a packing material, such as a ceramic fiber blanket, in an attempt to isolate solder adjacent the shaft from the atmosphere, it has been found that the minute dross particles tend to work into the interface between the shaft and the packing material, creating a drag on the shaft and a reduction in its operating speed. As a result, prior known soldering apparatus must frequently be taken out of service for part maintenance and/or replacement purposes.

Accordingly, a primary purpose of this invention is to provide new and improved methods of and apparatus for pumping solder in which the formation of dross in a molten solder bath by surface agitation of the bath, and the adverse effects of dross on the solder pumping operation, are essentially eliminated.

SUMMARY OF THE INVENTION

In general, in pumping solder for a soldering operation, a shaft and an impeller on the shaft are suspended into a container for a molten solder bath. As the shaft and impeller then are rotated to cause the impeller to pump solder in the molten solder bath to a point above an upper surface of the solder bath, the solder in the solder bath is precluded from making any significant contact with the rotating shaft.

More specifically, the shaft is supported for rotation solely in a support means located above the upper surface of the molten solder bath so that the solder in the solder bath does not contact the support means. Further, the shaft and the impeller are disposed in the molten solder bath within an associated housing means in slightly spaced relationship to respective adjacent opposed surfaces of the housing means to insure free rotation of the shaft and the impeller in the housing means. In this connection, a small amount of the solder from a portion of the molten solder bath below the upper surface of the bath is permitted to flow continuously between the impeller and the adjacent surface of the housing means into contact with the rotating shaft adjacent the impeller, where the solder flow is exposed to the atmosphere and forms a correspondingly small amount of solder dross. The thus formed solder dross then is confined adjacent the rotating shaft by the housing means, which extends above the upper surface of the molten solder bath, to preclude the solder in the solder bath from making any other contact with the shaft and to preclude mixing of the dross into the solder bath below the upper surface thereof. Thus, the dross initially rises vertically between the shaft and the adjacent surface of the housing means, and then rises vertically through an inverted essentially frustoconical chamber in the housing means to a level above the upper surface of the molten solder bath. The dross then falls from a top surface of the housing means to the upper surface of the molten solder bath and is removed from the bath surface.

BRIEF DESCRIPTION OF THE DRAWINGS

FIG. 2 is a front elevational view of another portion of the soldering apparatus, partially in cross-section;

FIG. 3 is a diagram illustrating the relationship of FIGS. 1 and 2;

DETAILED DESCRIPTION

Figure 6:
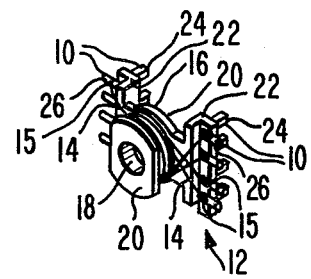
FIG. 6 is an isometric view of an electrical component which may be soldered utilizing the soldering apparatus of the invention.

Referring to FIGS. 2 and 6, the embodiment of the invention disclosed in this application is directed to apparatus 8 (FIG. 2) for dip-soldering terminals 10 on an electrical component 12, such as a transformer coil, to portions of wires 14 which have been wrapped on the terminals to form wire-wrapped connections 15. As is best shown in FIG. 6, each of the transformer coils 12 comprises a plastic bobbin 16 which includes a central hub 18 having a pair of opposed flanges 20 at its opposite ends. One of the flanges 20 is formed integrally with a pair of terminal support bars 22 located at opposite ends of the flange. The terminals 10 are of right angle construction and have first legs 24 which are mounted in the support bars 22 and which project from the support bars for mounting of the transformer coil 12 on a substrate, such as a printed circuit board (not shown). The terminals 10 also include second legs 26 upon which the wires 14, which have been wound on the bobbin 16, are wrap-connected as noted above.

In soldering the wire-wrapped connections 15 on the transformer coils 12 by use of the apparatus 8, solder in a solder bath 28 is continuously pumped by a pump 29 (FIGS. 1 and 4) to an orifice 30 (FIGS. 2 and 4) of a solder fountain 32 which projects above an upper surface level of the bath 28. One of the transformer coils 12 then is positioned on a rotatable horizontal shaft 34 above the solder orifice 30, as illustrated in FIG. 2. The shaft 34 then is moved vertically downward and simultaneously rotated, by a known type of mechanism (not shown), to dip the wire-wrapped connections 15 on one side of the coil 12 into the solder flowing from the solder orifice 30. The shaft 34 then is raised and again lowered, while being simultaneously rotated, to dip-solder the wire-wrapped connections 15 on the other side of the coil 12. The coil 12 and the shaft 34 then are raised and the coil is replaced on the shaft with another coil for another soldering operation.

Figure 1:
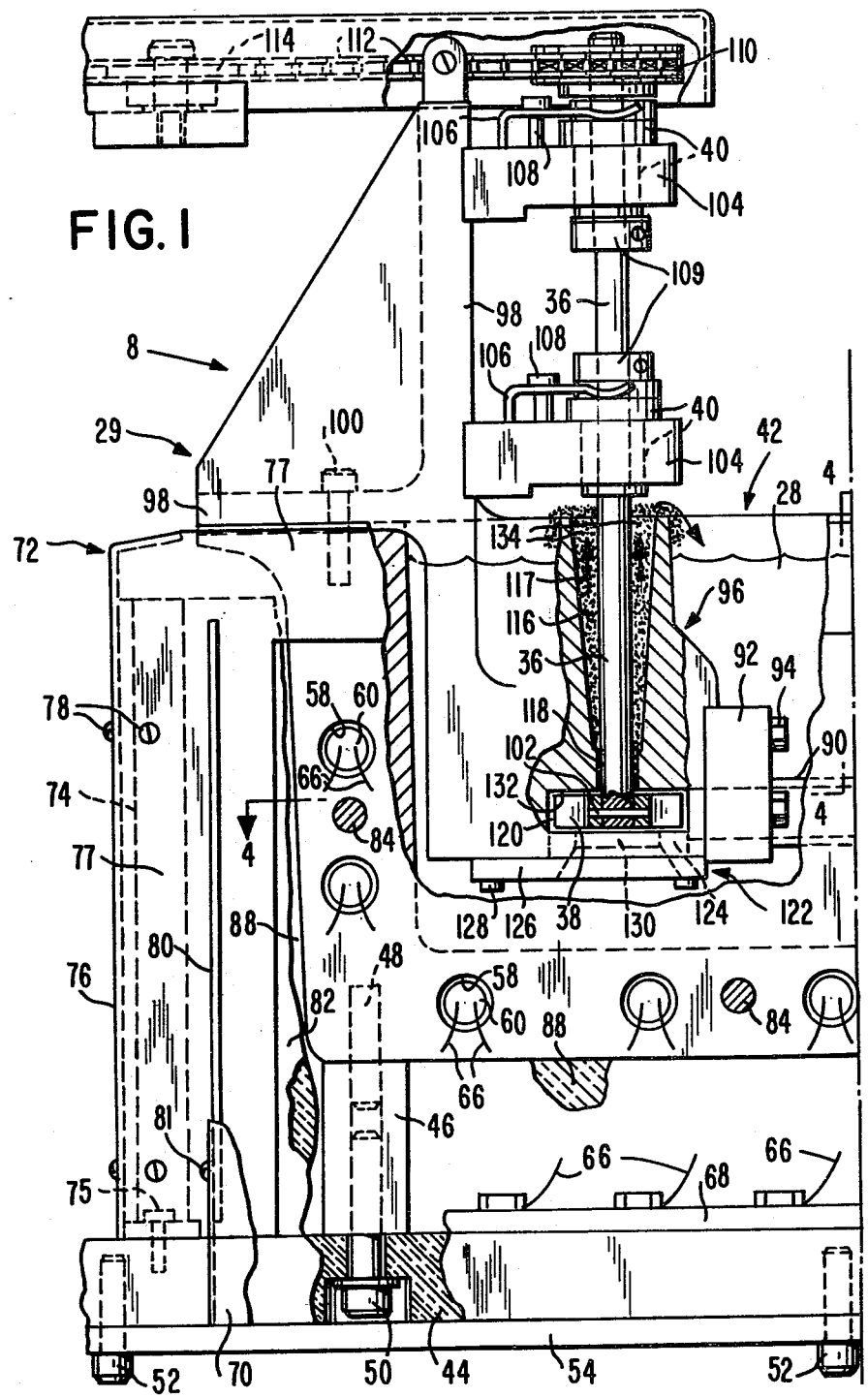
FIG. 1 is a front elevation view of a portion of a soldering apparatus in accordance with the invention, partially in cross-section.

Referring to FIG. 1, in accordance with this invention, the pumping of the solder in the molten solder bath 28 to the orifice 30 (FIG. 2) is accomplished by suspending a drive shaft 36 of the pump 29 and a pump impeller 38 on a lower end of the shaft in the solder bath so that solder in the solder bath is precluded from making any significant contact with the pump shaft. Thus, the creation of dross in the solder bath 28 as a result of the pump shaft 36 rotating directly in the bath, is eliminated. In addition, the mixing of dross (not shown) which inherently forms on the surface of the solder bath 28, into the solder bath as a result of the pump shaft 36 agitating the surface of the bath, also is eliminated. Further in accordance with this invention, the pump shaft 36 is supported in vertically spaced upper and lower bearings 40 (FIG. 1) located above the surface of the solder bath 28, thus avoiding freezing of the pump shaft in the bearings as a result of any dross particles in the solder bath working into the bearings.

Referring to FIGS. 1 and 2, the subject apparatus 8 includes a container in the form of a solder pot 42 of a material such as cast iron, for holding the molten solder bath 28. As is best shown in FIG. 1, the solder pot 42 is mounted at each corner on a horizontal base member 44 of a suitable electrical-and-heat-insulating material, by a cylindrical spacer 46, a set screw 48 having opposite ends threaded into the solder pot and the cylindrical spacer, respectively, and a cap screw 50 extending through the base member and threaded into the cylindrical spacer. The base member 44 is secured by screws 52 to a horizontal metal base plate 54 having a support leg 56 (one shown in FIG. 2) at each corner thereof.

Figure 4:
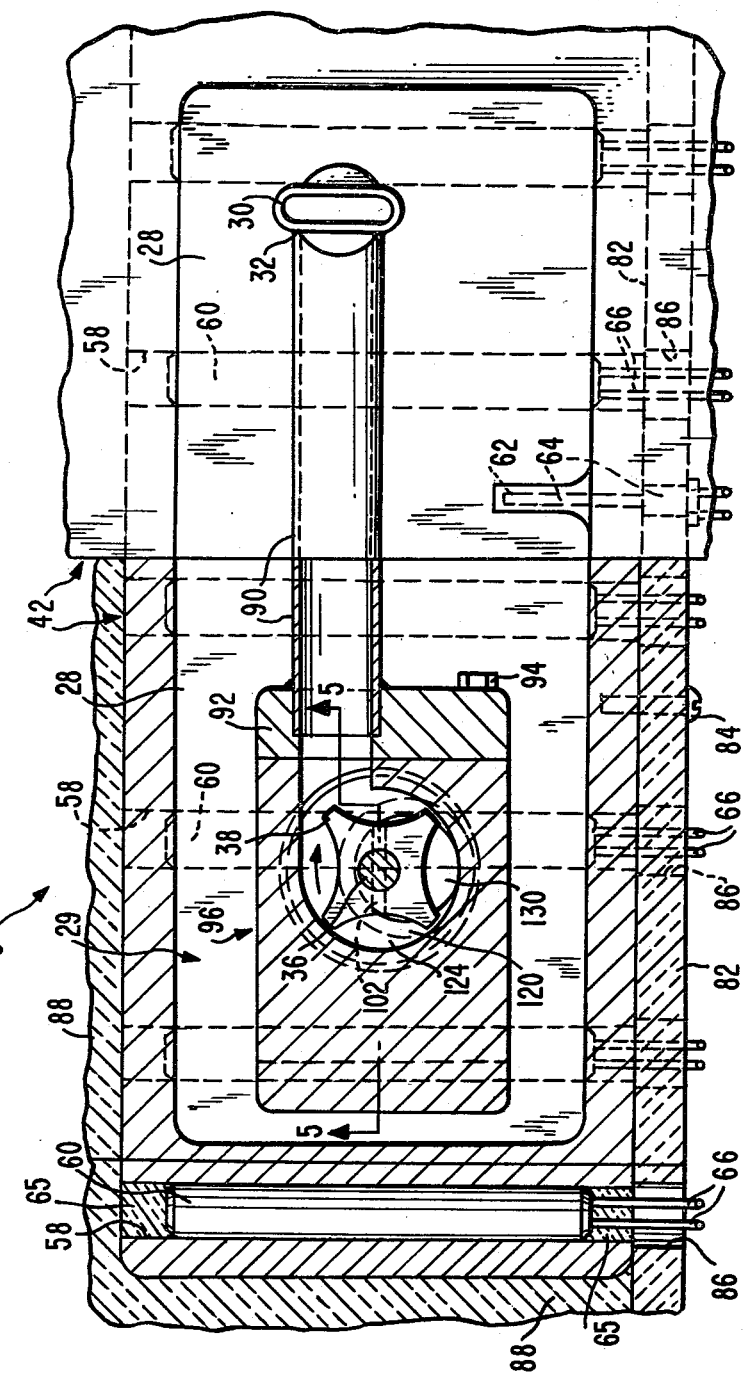
FIG. 4 is a partial plan view of the soldering apparatus, partially in cross-section, as viewed along line 4—4 in FIGS. 1 and 2.

Referring to FIGS. 1, 2 and 4, bottom and end walls of the solder pot 42 include elongated passageways 58 in which electrical heaters 60 are mounted. A front wall of the solder pot 42 also is formed with an elongated inwardly-directed recess 62 (best shown in FIG. 4) in which a thermocouple 64 is mounted in a known manner. As is also best shown in FIG. 4 at the left-hand side thereof, opposite ends of each heater 60 are recessed within its respective passageway 58, with opposite ends of the passageway being packed with a suitable heat-insulating fiber material 65. The electrical heaters 60 are suitably connected by wires 66 to a series of bus bars 68 (one shown in FIGS. 1 and 2) mounted on the insulating base member 44 at the front of the apparatus by screws 69 (one shown in FIG. 2). The bus bars 68 and the wires 66 are enclosed in a protective cover assembly 70, portions of which are shown at lower corners of FIGS. 1 and 2. The thermocouple 64 and the bus bars 68 are connected to a suitable power supply, not shown.

The solder pot 42 is disposed within a suitable metal housing assembly 72 comprising upstanding corner posts 74 (one shown in each of FIGS. 1 and 2) secured at their lower ends to the insulating base member 44 by screws 75. A pair of opposite end plates 76, a rear plate (not shown), and an inverted U-shaped front plate 77 are secured to vertical portions of the corner posts 74 by screws 78. The protective cover assembly 70 is mounted on forwardly projecting flanges 80 of the inverted U-shaped front plate 77 by screws 81.

As is best shown in FIGS. 1, 2 and 4, at least one heat-insulating plate member 82 is secured to the front of the solder pot 42 by screws 84, and includes apertures 86 (FIGS. 2 and 4) which permit access to the electrical heaters 60 for maintenance purposes. Similarly, the spaces between the ends and back of the solder pot 42 and the housing assembly 72, and the space between the bottom of the solder pot and the insulating base member 44, are filled with a suitable heat-insulating packing material 88.

Referring to FIGS. 2 and 4, the orifice 30 of the solder fountain 32 is integrally formed with an upper end of an arcuate tubular conduit 90. The tubular conduit 90 has an integral (e.g., welded) base portion 92 (FIGS. 1, 4 and 5) secured by screws 94 to a lower portion of a pump housing 96. The pump housing 96 is supported in the molten solder bath 28 by an integral support post 98 (FIG. 1) having a base portion secured to the top of the solder pot 42 by screws 100 (one shown in FIG. 1).

Figure 5:
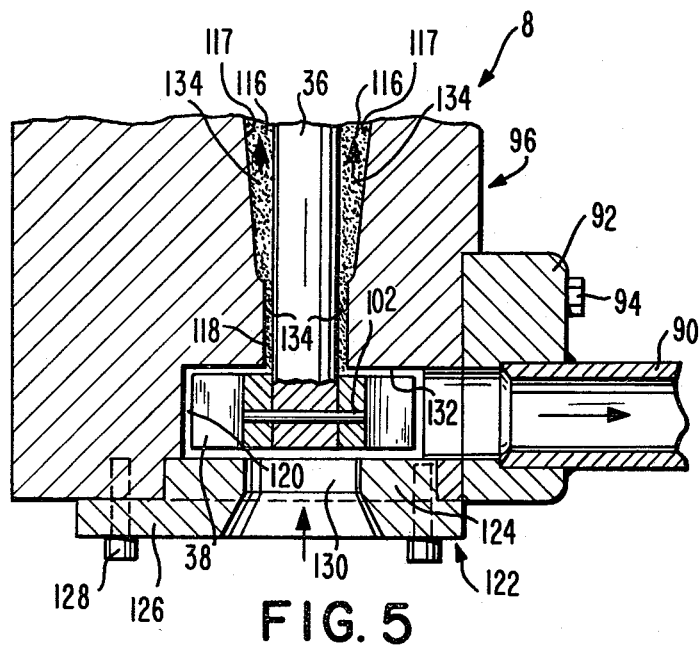
FIG. 5 is an enlarged, cross-sectional view of a portion of the soldering apparatus shown in FIG. 1, taken along line 5—5 in FIG. 4.

Referring to FIGS. 1, 4 and 5, the pump impeller 38 is secured at the lower end of the vertical pump shaft 36 by a pin 102. The pump shaft 36 and the impeller 38 are suspended in the solder bath 28 within the pump housing 96 by the upper and lower bearings 40 (FIG. 1) in which the shaft is rotatably mounted. The bearings 40 are mounted in brackets 104 (FIG. 1) located above the upper surface level of the molten solder bath 28, to preclude access of solder in the solder bath to the bearings, as noted hereinabove, and are retained in the brackets by respective leaf springs 106 secured to the brackets by screws 108. The brackets 104 are suitably secured to an upstanding portion of the support post 98 of the pump housing 96. Vertical axial movement of the pump shaft 36 is precluded by a pair of clamp collars 109 secured to the shaft below and above the upper and lower bearings 40, respectively. The pump shaft 36 includes a drive sprocket 110 secured to the upper end thereof and connected by a link chain 112, which extends over suitable idler pulleys 114 (one shown in FIG. 1), to a drive motor (not shown).

To preclude the solder in the solder bath 28 from making any significant contact with the pump shaft 36, an upper end of the pump housing 96 extends above the upper surface level of the solder bath as shown in FIG. 1. Thus, the pump shaft 36 does not rotate directly in the molten solder bath 28, as in prior known solder pumping systems, to cause agitation of the surface of the bath. As a result, the continuous circulation and exposure of clean solder in the solder bath 28 to the atmosphere, with the resultant creation of dross, and the mixing of dross into the solder bath by the rotating pump shaft 36, are essentially eliminated.

The vertical pump shaft 36 extends downwardly through the pump housing 96 in an upper inverted essentially frustoconical housing chamber 116 which is open to the atmosphere at an upper end thereof and which has an upwardly tapered innner surface 117. The pump shaft 36 then extends downward through a cylindrical passageway 118 in a portion of the pump housing 96 between the lower end of the inverted essentially frustoconical chamber 116 and an impeller chamber 120 of the housing.

Referring to FIGS. 1 and 5, a cover member 122 for the pump impeller chamber 120 has a cylindrical portion 124 received in a conforming cylindrical recess in the bottom of the pump housing 96 in spaced relationship to the impeller 38, and has a rectangular base portion 126 secured to the bottom of the pump housing by screws 128. The cover member 122 also includes a cylindrical opening 130 which has a conically tapered entrance, as is best shown in FIG. 5, and which is offset with respect to the axis of rotation of the pump impeller 38, as is best shown in FIG. 4. Thus, the impeller 38 draws solder into the impeller chamber 120 through the opening 130 only from a lower portion of the solder bath 28 and discharges the solder from the impeller chamber through the tubular conduit 90. As a result, only relatively clean solder is drawn into the impeller chamber 120 by the impeller 38 and presented to each of the transformer coils 12 (FIG. 2) through the solder fountain orifice 30 (FIG. 2) during a soldering operation, thereby facilitating the forming of good soldered connections between the terminals 10 and the wires 14 of the coil.

An upper wall of the pump impeller chamber 120 is defined by a horizontal inner surface 132 (FIGS. 1 and 5) of the pump housing 96. The impeller 38 is located in slightly spaced relationship below the horizontal surface 132 to insure free rotation of the impeller without permitting an excessive amount of solder to flow through the resultant gap between the impeller and the surface to the pump shaft 36. In this regard, in the disclosed embodiment of the invention, wherein the temperature of the solder bath 28 may be on the order of up to 1000° F. and wherein the pump housing 96 is of cast iron and thus has a higher heat coefficient-of-expansion than the pump shaft 36, which is of stainless steel, the pump housing tends to expand vertically relative to the pump shaft. As a result, the upper horizontal surface 132 of the housing impeller chamber 120 tends to expand downward relative to the pump shaft 36 toward the pump impeller 38 slightly when the soldering apparatus 8 is operating. Thus, a slight initial clearance, such as 8-10 mils (enlarged in FIGS. 1 and 5 for purposes of illustration), which subsequently closes to on the order of 2 mils, is provided between the pump impeller 38 and the impeller chamber upper horizontal surface 132 to permit a small amount of solder to flow continuously at a slow controlled rate through the resultant gap between the pump impeller and the impeller chamber surface and thereby preclude subsequent metal-to-metal contact between the impeller and the surface.

In prior solder pumping systems it has been found that when a pump shaft such as the pump shaft 36 is supported in a bearing exposed to solder in the solder bath 28, or is packed with packing material in an attempt to isolate solder adjacent the shaft from the atmosphere, minute dross particles in the solder bath tend to work into the bearing or the interface between the shaft and the packing material, to interfere with proper rotation of the shaft. Thus, in accordance with this invention, rather than attempt to preclude the formation of dross adjacent the mounting of the pump impeller 38 on the pump shaft 36, the small amount of solder which is permitted to flow continuously through the gap between the pump impeller and the impeller chamber upper surface 132 to the pump shaft, is permitted to form into dross at the pump shaft. In this regard, as is best shown in FIG. 5, the pump shaft 36 is disposed in the cylindrical passageway 118 in the pump housing 96 with a slight clearance with respect to a wall of the passageway, such as 1/32 inch (enlarged in FIGS. 1 and 5 for purposes of illustration), to insure free rotation of the shaft in the passageway and so that the lower end of the passageway is essentially exposed to the atmosphere. Thus, as the small amount of solder which flows through the gap between the pump impeller 38 and the impeller chamber upper surface 132, reaches the lower end of the cylindrical passageway 118, the solder becomes exposed to the atmosphere in the passageway and begins to oxidize to form a correspondingly small amount of light powdery dross 134, as illustrated in FIG. 5. Since the dross 134 is in the form of a light powder, the dross does not interfere with the rotation of the pump shaft 36 in the cylindrical passageway 118. Further, as additional dross 134 continues to form in the cylindrical passageway 118, previously formed dross rises vertically in the passageway into the inverted frustoconical chamber 116, as is also illustrated in FIG. 5.

As a result of the upwardly tapered configuration of the inner surface 117 of the inverted frustoconical chamber 116, as additional dross 134 continues to form in the cylindrical passageway 118 and to rise into the chamber, the high speed rotation of the pump shaft 36 tends to throw the light powdery dross in the chamber outward away from the shaft toward the upwardly tapered inner surface. The dross 134 in the inverted frustoconical chamber 116 then continues to rise vertically in the chamber to the upper end thereof and eventually spills over a top surface of the pump housing 96, so as to fall onto the upper surface of the solder bath 28, as illustrated in FIG. 1. The dross 134 then can subsequently be removed from the upper surface of the solder bath 28 in a routine cleaning operation along with other dross (not shown) which inherently forms and floats on the exposed surface of the bath during the soldering operation. Thus, the dross 134 which forms adjacent the pump shaft 36, in addition to having no adverse effect upon the rotation of the shaft, does not become mixed into the solder bath 28 by rotation of the shaft.

In summary, a new and improved solder pumping system has been disclosed in which an undesirable buildup of dross on and around the rotating pump shaft 36, the formation of dross in the molten solder bath 28 as a result of agitation of the bath by the rotating pump shaft, the mixing of dross into the solder bath by the rotating pump shaft, and the adverse effects of dross on the solder pumping operation, are essentially eliminated. This is accomplished by supporting the pump shaft 36 solely in the bearings 40 above the upper surface level of the solder bath 28, with the shaft and the pump impeller 38 disposed in the solder bath within the pump housing 96 so that solder in the solder bath is precluded from making any significant contact with the rotating shaft. More specifically, since the upper end of the pump housing 96 extends above the upper surface level of the solder bath 28, as shown in FIG. 1, the pump shaft 36 does not rotate directly in the solder bath during a soldering operation with the undesirable results noted hereinabove. Rather, the only access which solder in the solder bath 28 has to pump shaft 36 is through the cylindrical opening 130 in the housing bottom cover member 122 (FIGS. 1, 4 and 5) and the gap between the impeller 38 and the impeller chamber upper wall surface 132. In this regard, the amount of solder which actually flows into contact with the pump shaft 36 is limited and controlled by the small size of this gap. Further, this solder flow, upon being exposed to the atmosphere in the oversize cylindrical passageway 118, forms the light powdery dross 134 which does not interfere with the rotation of the pump shaft 36 in the cylindrical passageway. Rather, as the light powdery dross 134 forms, it continuously rises upward through the cylindrical passageway 118 and the inverted frustoconical chamber 116, to the top of the pump housing 96. The dross 134 then spills over the top of the pump housing 96 and falls onto the surface of the solder bath 28, as shown in FIG. 1, for subsequent removal with other dross (not shown) in a routine cleaning operation, without becoming mixed into the solder bath by the rotating pump shaft 36.

What is claimed is:

1. A method of pumping solder in a soldering operation, which comprises:
    supporting a rotatable shaft for rotation solely in support means located above an upper surface of a molten solder bath such that the solder in the solder bath does not contact the support means;
    suspending the rotatable shaft and an impeller on the shaft from the support means and into a container for holding the molten solder bath;
    rotating the shaft and the impeller to pump solder in the molten solder bath to a molten solder discharge position; and
    precluding the solder at the upper surface of the molten solder bath from making any significant contact with the rotating shaft as the solder is pumped to the molten solder discharge position.

2. A method of pumping solder in a soldering operation, which comprises:
    suspending a rotatable shaft and an impeller on the shaft into a container for holding a molten solder bath;
    rotating the shaft and the impeller to pump solder in the molten solder bath to a molten solder discharge position;
    precluding the solder at an upper surface of the molten solder bath from making any significant contact with the rotating shaft as the solder is pumped to the molten solder discharge position;
    maintaining the impeller and an opposed surface of an associated housing means in slightly spaced relationshp during the soldering operation;
    permitting a small amount of solder from a portion of the molten solder bath below the upper surface of the bath to flow continuously between the impeller and the opposed surface of the housing means to the rotating shaft adjacent the impeller;
    exposing the limited amount of solder flowing between the impeller and the opposed surface of the housing means, to the atmosphere adjacent the rotating shaft so that the solder forms solder dross; and
    precluding the thus formed solder dross from contacting portions of the molten solder bath below the upper surface of the bath, to preclude mixing of the solder dross into the solder bath.

3. The method as recited in claim 2, which further comprises;
    confining the solder dross adjacent the rotating shaft in a manner such that, as the dross is continuously formed adjacent the impeller, the dross rises vertically adjacent the shaft to a level above the upper surface of the molten solder bath.

4. The method as recited in claim 3, which further comprises:
    permitting the dross to fall to the upper surface of the molten solder bath after the dross has risen to the level above the upper surface of the bath; and
    removing the dross from the upper surface of the molten solder bath.

5. A soldering apparatus, which comprises:
    container means for holding a molten solder bath;
    means for pumping solder from the molten solder bath to a molten solder discharge position, the solder pumping means including a rotatable shaft and an impeller mounted on the shaft;
    means for housing a lower portion of the rotatable shaft and the impeller in the molten solder bath during the soldering operation, the housing means including a solder entrance opening to permit solder in the solder bath access to the impeller, and the housing means extending upward adjacent to an upper portion of the rotatable shaft and above the level to which the solder bath fills the container means during the soldering operation so as to preclude the solder at an upper surface of the solder bath from making any significant contact with the rotatable shaft; and
    support means for suspending the lower portion of the rotatable shaft and the impeller in the housing means, the rotatable shaft being rotatably mounted in the support means solely above the level to which the solder bath fills the container means for the soldering operation so as to preclude access of solder in the solder bath to the support means during the soldering operation.

6. A soldering apparatus as recited in claim 5, in which:
    the support means for suspending the rotatable shaft and the impeller in the housing means is separate from, and located above, the housing means.

7. A soldering apparatus as recited in claim 5, which further comprises:
    orifice means located at the molten solder discharge position for directing a flow of molten solder from the molten solder bath to a position above the level to which the solder bath fills the container means for the soldering operation; and tubular conduit means connected to the housing means for conducting solder from the impeller to the orifice means.

8. A soldering apparatus, which comprises:

container means for holding a molten solder bath;

means for pumping solder from the solder bath to a molten solder discharge position, the solder pumping means including a rotatable shaft and an impeller mounted on the shaft;

means for housing a lower portion of the rotatable shaft and the impeller in the molten solder bath during the soldering operation, the housing means including a solder entrance opening to permit solder in the solder bath access to the impeller, and the housing means extending upward adjacent to an upper portion of the rotatable shaft and above a level to which the solder bath fills the container means during the soldering operation so as to preclude the solder at an upper surface of the solder bath from making any significant contact with the rotatable shaft;

an impeller chamber in the housing means and in which the impeller is mounted in slightly spaced relationship below an opposed surface of the chamber; and a cylindrical passageway in the housing means which is open to the atmosphere during the soldering operation, the cylindrical passageway being located above and opening through the opposed surface of the impeller chamber, and the rotatable shaft being disposed in the cylindrical passageway in slightly spaced relationship to a wall of the passageway.

9. A soldering apparatus as recited in claim 8, in which the housing means further includes:

an inverted frustoconical chamber extending above the cylindrical passageway and through which the rotatable shaft extends downward to the cylindrical passageway.

10. A soldering apparatus as recited in claim 8, which further comprises:

support means for suspending the lower portion of the rotatable shaft and the impeller in the housing means, the rotatable shaft being rotatably mounted in the support means solely above the level to which the solder bath fills the container means so as to preclude access of solder in the solder bath to the support means during the soldering operation.

11. A soldering apparatus as recited in claim 10, in which:

the support means for suspending the rotatable shaft and the impeller in the housing means is separate from, and located above, the housing means.

12. A soldering apparatus as recited in claim 11, in which the housing means further includes:

an inverted frustoconical chamber extending above the cylindrical passageway and through which the rotatable shaft extends from the support means to the cylindrical passageway.

* * * * *